J. F. THOMPSON & H. S. HANSTINE.
INVESTMENT HOLDER FOR DENTAL SOLDERING.
APPLICATION FILED NOV. 18, 1909.
966,369.
Patented Aug. 2, 1910.
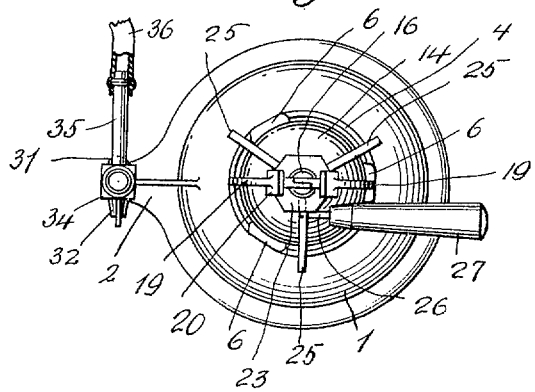
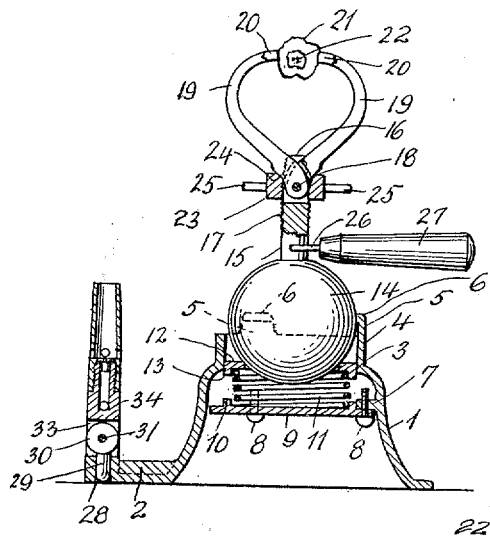
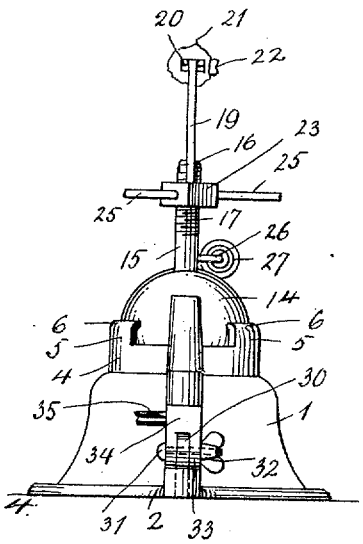
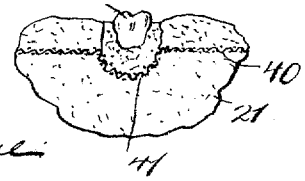
Witnesses.
Samuel Payne
O. H. Butler
Inventors
J. F. Thompson
H. S. Hanstine
by N. C. Evers Co.
Attorneys.
THE NORRIS PETERS CO., WASHINGTON, D. C.

UNITED STATES PATENT OFFICE.

JAMES F. THOMPSON, OF PITTSBURG, AND HARRY S. HANSTINE, OF AMBRIDGE, PENNSYLVANIA.

INVESTMENT-HOLDER FOR DENTAL SOLDERING.

966,369. Specification of Letters Patent. Patented Aug. 2, 1910.

Application filed November 18, 1909. Serial No. 528,698.

*To all whom it may concern:*

Be it known that we, (1) JAMES F. THOMPSON and (2) HARRY S. HANSTINE, citizens of the United States of America, residing at (1) Pittsburg and (2) Ambridge, in the counties of (1) Allegheny and (2) Beaver and State of Pennsylvania, have invented certain new and useful Improvements in Investment-Holders for Dental Soldering, of which the following is a specification, reference being had therein to the accompanying drawing.

This invention relates to an investment-holder for dental soldering, and the primary object of our invention is to provide a holder that can be adjusted to properly present a desired portion of the investment to the action of a burner located in proximity to the holder.

Another object of this invention is to provide an adjustable investment-holder with an adjustable burner that can be positioned at a desired inclination to project the flame thereof upon a desired portion of the investment.

A further object of this invention is to provide an investment-holder with novel gripping arms that can be easily and quickly set to firmly hold an investment.

A still further object of this invention is to furnish an investment-holder with positive and reliable means for maintaining the holder in an adjusted position.

A still further object of this invention is to accomplish the above results by an adjustable holder that is simple in construction, durable, easy to manipulate and highly efficient for facilitating the operation of dental soldering.

With the above and such other objects in view as may hereinafter appear, the invention consists of the novel construction, combination and arrangement of parts to be hereinafter specifically described and then claimed.

Reference will now be had to the drawing forming a part of this specification, in which:—

Figure 1 is a plan of the holder. Fig. 2 is a vertical sectional view of the same. Fig. 3 is a side elevation of the holder, and Fig. 4 is a sectional view of the investment.

In the accompanying drawings the reference numeral 1 denotes an inverted cup-shaped base provided with a side extension 2 in a horizontal plane with the lower edges of the base. The top of the base is provided with a central opening 3 surrounded by a vertical collar 4 having vertical equally spaced lugs 5 with the upper ends of said lugs bent inwardly, as at 6. The inner walls of the base 1, adjacent to the opening 3, are provided with a plurality of inwardly projecting horizontal lugs 7 and connected to said lugs by screws 8 is a circular plate 9. The upper surface of the plate is provided with an annular rim 10 sufficiently removed from the edges of the plate to provide clearance for the lugs 7 and the screws 8. Upon the plate 9 within the rim 10 is mounted a coiled compression spring 11 and supported upon the upper end of this spring is an annulus or ring 12 having a depending rim 13 surrounding the uppermost convolution of the spring 11. In the annulus or ring 12 is seated a spherical body or ball 14, which is centered within the collar 4 by the lugs 5.

Suitably mounted in or upon the ball 14 is a post 15 having the upper end thereof bifurcated, as at 16, and exteriorly screw threaded, as at 17. Pivotally mounted in the bifurcation 16 of the post 15 by a transverse pin 18 are the lower ends of curved gripping arms 19, the upper ends of said arms being enlarged, as at 20, to grip oppositely disposed sides of an investment 21 adapted to hold a piece of work 22. Prior to pivoting the gripping arms 19 in the bifurcated end of the post a nut 23 is screwed upon the post and the upper face of the nut is reamed out to provide a beveled surface 24 converging toward the opening of the nut. This surface is adapted to contact with the lower outer edges of the arms 19 and force the upper ends of said arms together and hold the same in engagement with an investment. To facilitate the rotation of the nut 23, the sides of the nut are provided with radially disposed handles 25. The post 15 adjacent to the base thereof is provided with an extension 26 for a handle 27, which permits of the spherical body or ball 14 being easily adjusted in the base.

The extension 2 is provided with a vertical opening 28 adapted to receive the cylindrical shank 29 of a bearing 30, and adjustably connected to the bearing 30 by a bolt 31 and a wing thumb nut 32 is the lower bifurcated end 33 of a Bunsen burner 34. This burner is provided with a right angular tubular connection 35 for a flexible gas supply pipe 36.

The elements 1, 3 to 14 inclusive constitute a ball and socket or universal joint while the elements 15, 19 and 23 constitute a vise for holding the investment upon the ball 14 whereby the investment can be properly positioned to receive the full force of the flame from the Bunsen burner 34, which can be adjusted to project the flame toward the piece of work held by the investment.

The investment-holder in its entirety is made of light and durable metal and easy access can be had to each part of the holder when it is desired to remove or repair parts of the same.

Through the medium of the spring 11 and the lugs 5 the spherical body or ball 14 can be readily held in the position to which it is adjusted, irrespective of irregularities in the spherical body or ball.

In Fig. 4 of the drawings, we have shown the investment 21 as reinforced by a piece of wire gauze or expanded metal 40, the piece of wire gauze being shaped to provide a pocket or recess 41 in which is mounted by a plastic material similar to the investment the piece of work 22. The reinforcement prevents the investment from being broken or disintegrated, and by eliminating the lower portion of the investment, a rib or ridge is provided by the pocket or recess which allows the investment to be more easily grasped by the vise of our improvement.

It will be understood that the investment-holder can be used in connection with a blow-pipe or any other suitable means of obtaining a flame that will fuse matter to be joined together, either by the action of the flame or flux or soldering material.

Having now described our invention, what we claim as new is:—

1. An investment holder comprising a base, a spring pressed adjustable body mounted in said base, a post connected to the body, adjustable gripping arms carried by the post and adapted to support said investment, a handle projecting from the post, means for maintaining the gripping arms in their adjusted position, handles projecting from said means, a lateral extension formed on the base, and an adjustable burner connected to said lateral extension.

2. An investment-holder comprising a base, an adjustable spring-pressed body carried by said base, a post carried by said body, gripping arms carried by said post and adapted to engage an investment, and means upon said post adapted to hold said gripping arms in engagement with the investment.

3. An investment-holder comprising a base, an adjustable spring-pressed body carried by said base, a post carried by said body, gripping arms carried by said post and adapted to engage an investment, means upon said post adapted to hold said gripping arms in engagement with the investment, and an adjustable burner supported by said base.

In testimony whereof we affix our signatures in the presence of two witnesses.

JAMES F. THOMPSON.
HARRY S. HANSTINE.

Witnesses:
KARL H. BUTLER,
PAUL A. BECK.